(12) United States Patent
Czank

(10) Patent No.: US 6,338,502 B1
(45) Date of Patent: Jan. 15, 2002

(54) INTERLOCK BUCKLE FOR DETACHABLE SEAT BELT SYSTEM

(75) Inventor: Stephen C. Czank, Northville, MI (US)

(73) Assignee: Autoliv ASP, Inc, Ogden, UT (US)

( * ) Notice: Subject to any disclaimer, the term of this patent is extended or adjusted under 35 U.S.C. 154(b) by 0 days.

(21) Appl. No.: 09/502,930

(22) Filed: Feb. 11, 2000

(51) Int. Cl.⁷ ................................................. B60R 22/00
(52) U.S. Cl. ............................ 280/808; 24/630; 24/633
(58) Field of Search .............................. 280/801.1, 808; 24/630, 633

(56) References Cited

U.S. PATENT DOCUMENTS 5,142,748 A    9/1992  Anthony
5,421,615 A *  6/1995  Asagiri et al. .............. 280/808
5,671,948 A    9/1997  Susko
5,813,097 A    9/1998  Woellert
6,055,708 A    8/1999  Ellis
6,116,696 A *  9/2000  Widman et al. ............ 297/483

* cited by examiner

Primary Examiner—Paul N. Dickson
(74) Attorney, Agent, or Firm—Sally J. Brown; James D. Erickson

(57) ABSTRACT

A buckle system and mechanism for use in a seat belt vehicle restraint system which provides an interlock for ensuring that the occupant has the correct web position for the lap and shoulder belt portions of a three-point seat belt system. This buckle system permits only one tongue to be inserted in the interlock at a time. Moreover, the insertion of one tongue causes the ejection of the other tongue. Once placed into use, this invention ensures that one of the tongues is latched.

13 Claims, 9 Drawing Sheets

INTERLOCK BUCKLE FOR DETACHABLE SEAT BELT SYSTEM

BACKGROUND OF THE INVENTION

1. Field of the Invention

This invention relates to seat belt restraint systems for vehicle passenger safety. More particularly, this invention relates to seat belt buckle devices.

2. Description of the Related Art

It is well known in the prior art to provide a buckle for an automotive or other vehicle seat belt. Typically, such prior buckle devices are simple latch and release devices that do not incorporate an interlock that ensures that only one, and always one, belt system tongue is inserted and locked in the buckle. For general background material, the reader is directed to the following U.S. Pat. Nos.: 3,633,697, 3,648,333, 3,718,902, 3,732,538, 3,744,794, 3,748,640, 3,757,293, 3,770,919, 3,781,967, 3,796,888, 3,831,140, 3,833,781, 3,863,209, 3,864,668, 3,874,474, 3,956,603, 3,969,795, 3,996,648, 4,000,385, 4,015,094, 4,034,931, 4,052,775, 4,060,878, 4,099,306, 4,107,645, 4,136,328, 4,197,919, 4,445,722, 4,480,713, 4,531,762, 4,569,536, 4,637,102, 4,667,336, 4,691,875, 4,742,886, 4,844,196, 4,871,044, 4,915,413, 5,054,171, 5,088,160, 5,098,162, 5,121,527, 5,165,498, 5,292,153, 5,322,348, 5,394,955, 5,395,136, 5,484,190, 5,671,948, 5,685,567, 5,742,986, 5,781,971, 5,881,439, 5,898,366, 5,907,892, 5,944,135 each of which is hereby incorporated by reference in its entirety for the material contained therein.

SUMMARY OF THE INVENTION

It is desirable to provide a buckle mechanism that incorporates an interlock to facilitate a detachable seat belt system that ensures the correct placement of the lap and shoulder belt portions of a three-point seat belt system. Moreover, it is desirable to provide a vehicle seat belt restraint buckle that permits only one seat belt web attachment tongue to be latched at any one particular time.

Therefore, it is the general object of this invention to provide a vehicle safety restraint seat belt buckle that incorporates an interlock mechanism to permit only one web tongue to be latched at a time.

It is a further object of this invention to provide a vehicle safety restraint seat belt buckle that ensures the correct placement of the lap and shoulder belt portions of a three-point seat belt system.

It is another object of this invention to provide a vehicle safety restraint seat belt buckle that ensures that the insertion of one web tongue causes the ejection of the other web tongue.

It is a further object of this invention to provide a vehicle safety restraint seat belt buckle that, once first used, does not permit a condition where neither of the web restraint tongues are latched.

Another object of this invention is to provide a vehicle safety restraint seat belt buckle that requires the buckle be connected to the static tongue in order to permit the release of the restraint tongue.

A still further object of this invention is to provide a vehicle safety restraint seat belt buckle that is compatible with existing three-point seat belt restraint systems.

These and other objects, advantages, and other novel features of this invention will be set forth in part in the description that follows and in part will become apparent to those skilled in the art upon examination of the following or may be learned with the practice of the invention. The objects and advantages of this invention may be realized and attained by the means of the instrumentalities and combinations particularly pointed out in the appended claims. Still other objects of the present invention will become readily apparent to those skilled in the art from the following description and drawings, wherein there is shown and described the preferred embodiment of this invention. This preferred embodiment is presented simply by way of illustration of one of the modes best suited to carry out this invention. As it will be realized, this invention is capable of other different embodiments, and its several details are capable of modification in various aspects without departing from the invention. Accordingly, the drawings and descriptions should be regarded as illustrative in nature and not as restrictive.

To achieve the foregoing and other objectives, and in accordance with the purposes of the present invention, this seat belt buckle system is provided with an interlocking rocker that is spring loaded to hold a single tongue in place.

BRIEF DESCRIPTION OF THE DRAWINGS

The accompanying drawings incorporated in and forming a part of the specification, illustrate a preferred embodiment of the present invention. Some, although not all, alternative embodiments are described in the following description. In the drawings.

Reference will now be made in detail to the present preferred embodiment of the invention, an example of which is illustrated in the accompanying drawings.

DETAILED DESCRIPTION OF THE INVENTION

Figure 1:
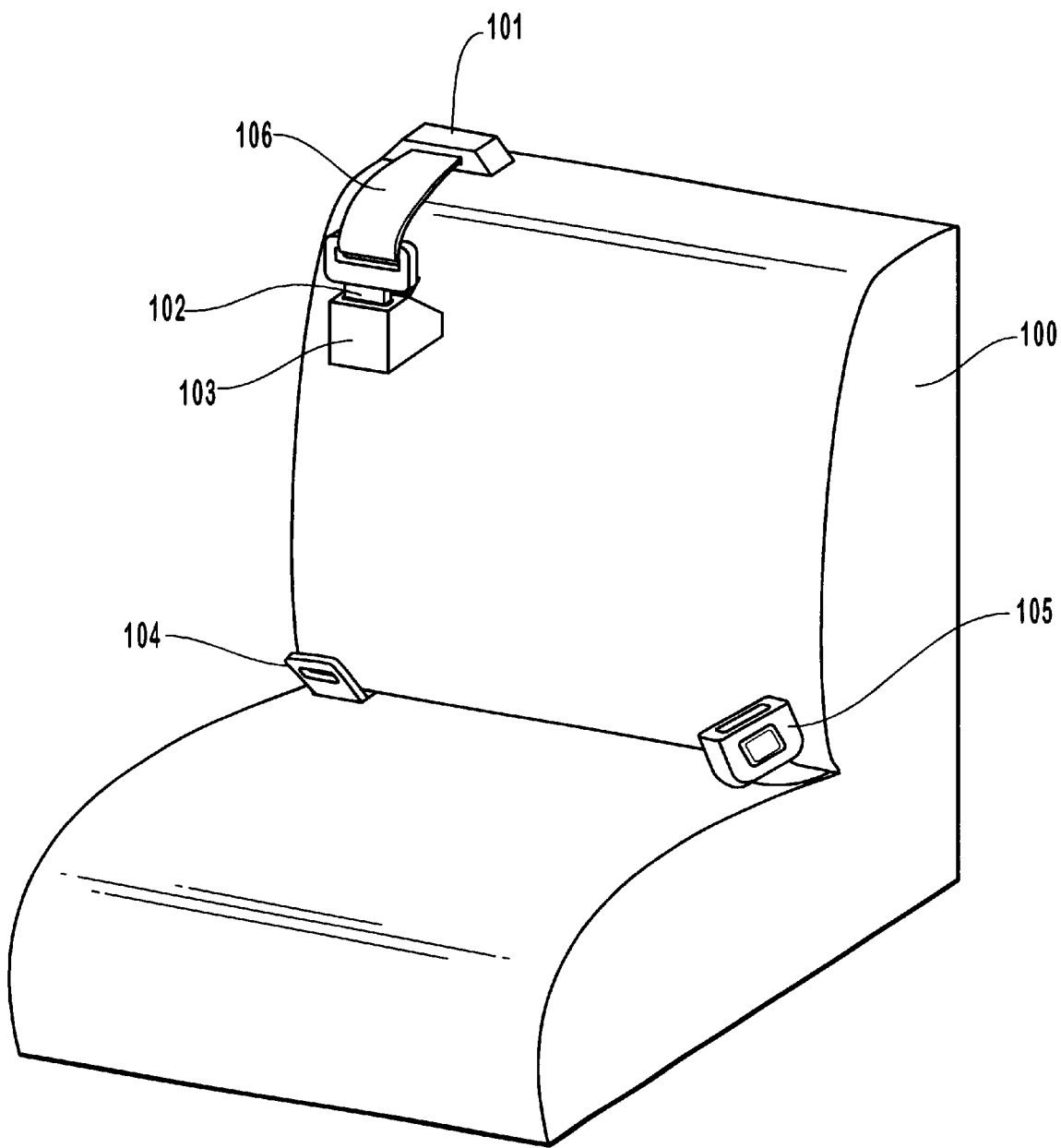
FIG. 1 is a three dimensional perspective view of the preferred seat belt buckle-interlocking system of this invention.

FIG. 1 shows a three dimensional perspective view of the preferred seat belt buckle-interlocking system of this invention. A typical vehicle seat 100 is used as the mounting points of the components of this invention. In alternative uses of this system, the components of this invention can also be mounted to the vehicle directly. While the seat 100 shown in this figure is a bench seat, alternative seats, including bucket seats, can be substituted without departing from the concept of this invention. The seat belt retractor 101 is shown mounted on the top rear of the seat 100, although alternatively, it could be mounted at other positions with the vehicle, such as on the interior of the vehicle roof, either interior side, or a support post mounted within the vehicle, without departing from the concept of this invention. Loaded in the seat belt retractor 101, is a seat belt webbing strap 106, on the end of which is a web tongue 102, locked to which is the interlocking buckle 103 of this invention. The static tongue 104 is provided extending from the seat 100 for connection to the interlocking buckle 103. A seat buckle 105 is provided also for connection to the web tongue 102 for use when a passenger is seated.

Figure 2:
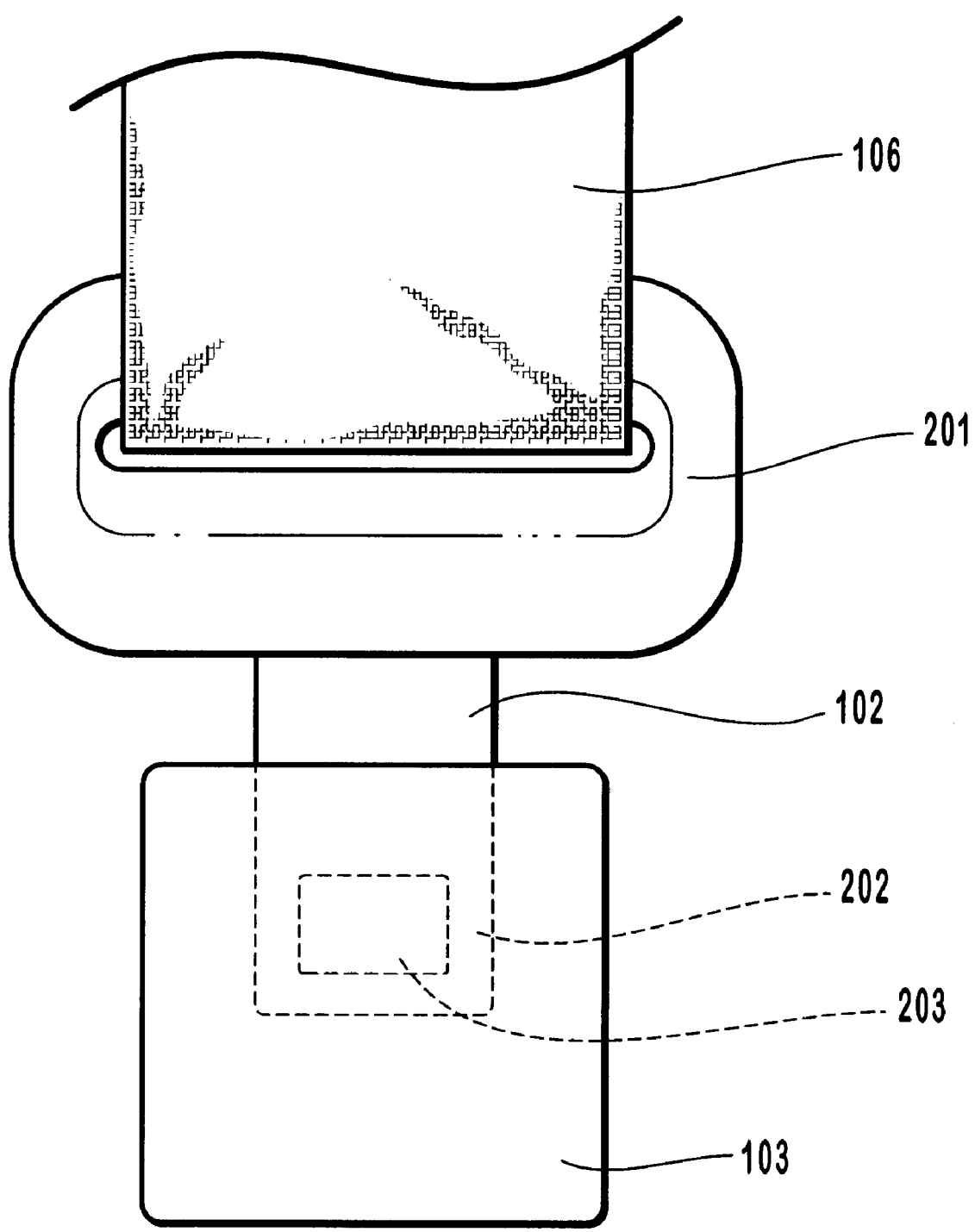
FIG. 2 is a close-up view of the preferred interlocking buckle with the web tongue locked.

FIG. 2 shows a close-up view of the preferred interlocking buckle 103 with the web tongue 102 locked in place. This view shows that the preferred web tongue 102 has a portion 202, which is loaded into the interlocking buckle 103, when the buckle is not in use, and has a slot 203 for receiving a catch (shown in FIGS. 6–9) within the interlocking buckle 103. A strain relief 201 is also provided as an attachment for the belt webbing 106 in the preferred embodiment of the invention.

Figure 3:
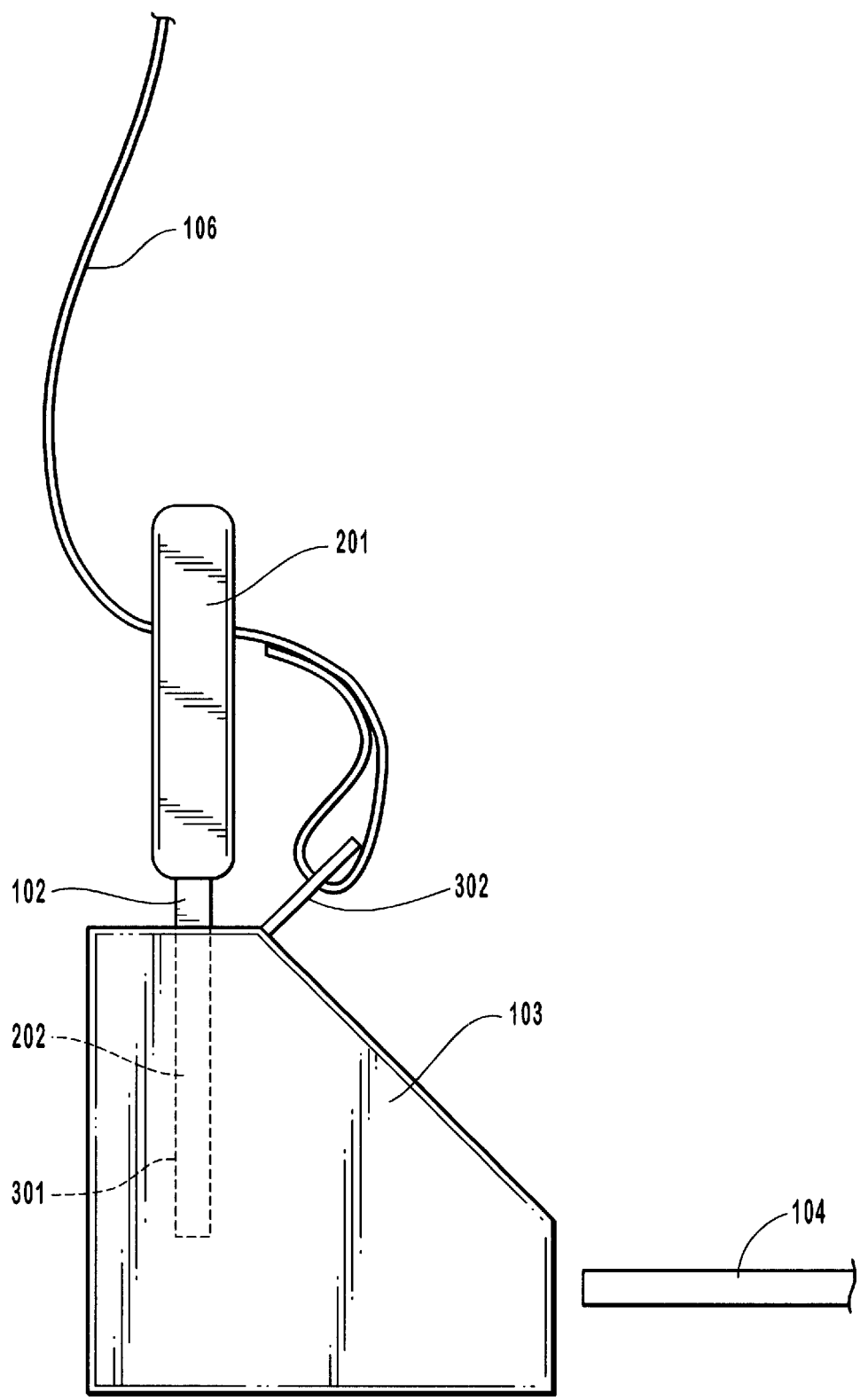
FIG. 3 is a side view of the preferred interlocking buckle with the web tongue locked and the static tongue in proximity thereto.

FIG. 3 shows a side view of the preferred interlocking buckle 103 with the web tongue 102 locked within a recess 301 in the buckle 103 and the static tongue 104 in proximity thereto. This view also shows the strap-to-interlocking buckle attachment 302 fixed to the interlocking buckle 103.

Figure 4:
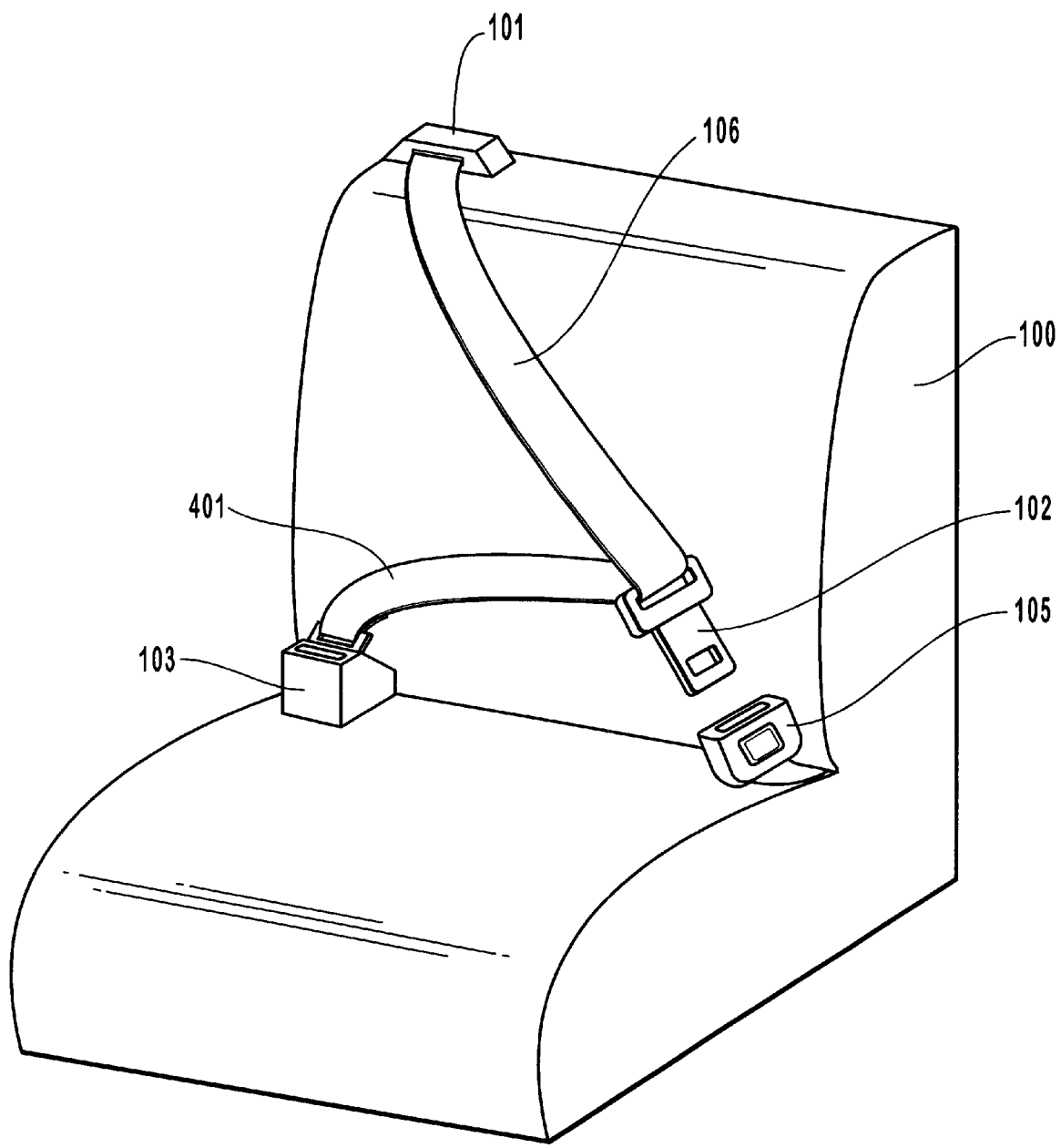
FIG. 4 is a three dimensional perspective view of the preferred seat belt buckle-interlocking system of this invention, with the buckle locked to the static tongue.

FIG. 4 is a three dimensional perspective view of the preferred seat belt buckle-interlocking system of this invention, with the interlocking buckle 103 locked to the static tongue 104. Besides the components shown and described above, this view shows a second web strap portion 401 extending from the web tongue 102 to the interlocking buckle 103, which in turn is locked to the static tongue 104. The web tongue 102 is extended toward the seat buckle 105, where typically it would be connected to secure the vehicle occupant.

Figure 5:
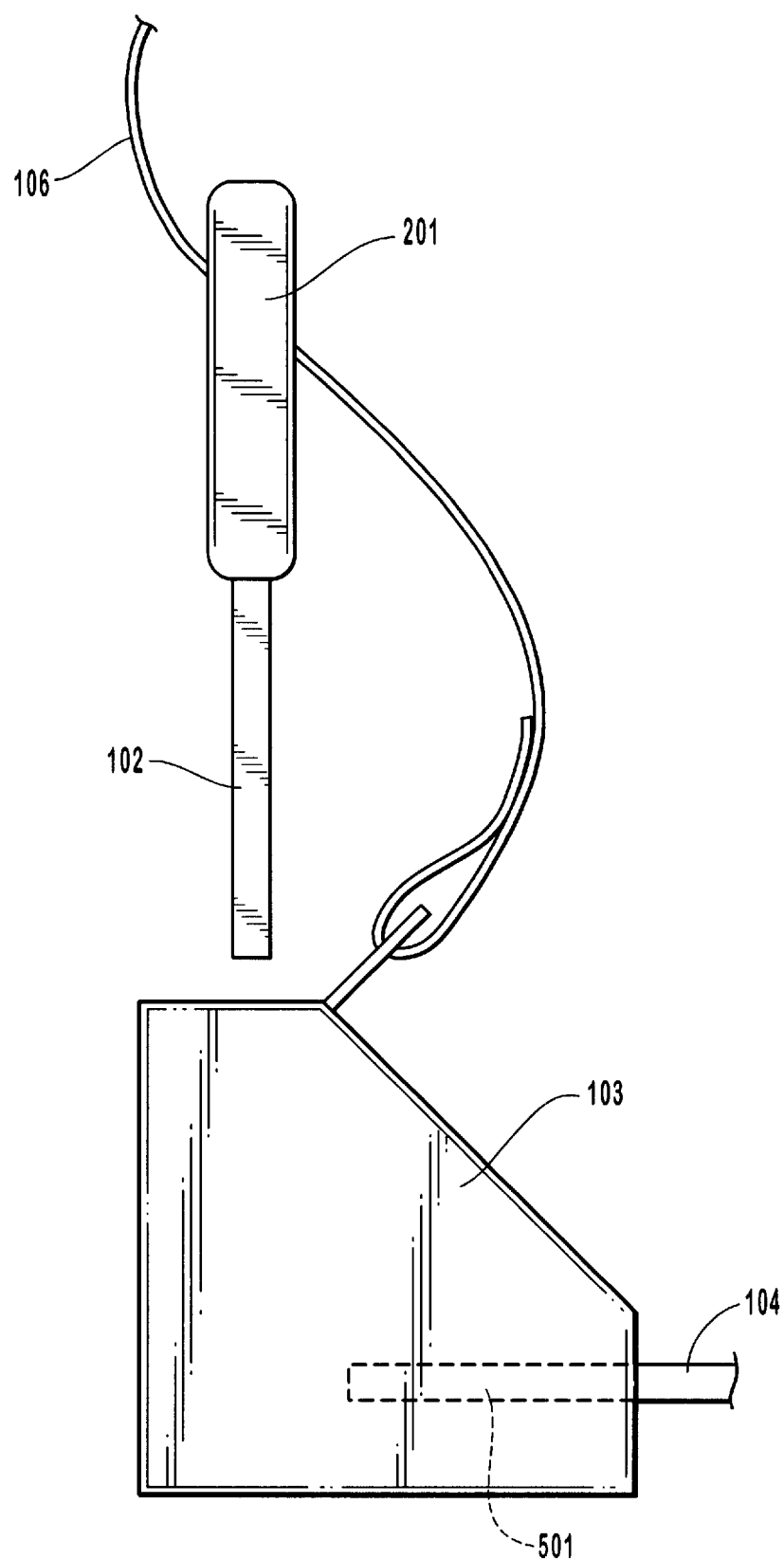
FIG. 5 is a side view of the preferred interlocking buckle of this invention, with the static tongue locked and the web tongue in proximity thereto.

FIG. 5 is a side view of the preferred interlocking buckle 103 of this invention, with the static tongue locked 104 within a recess 501 within the interlocking buckle 103 and the web tongue 102 in proximity thereto.

Figure 6:
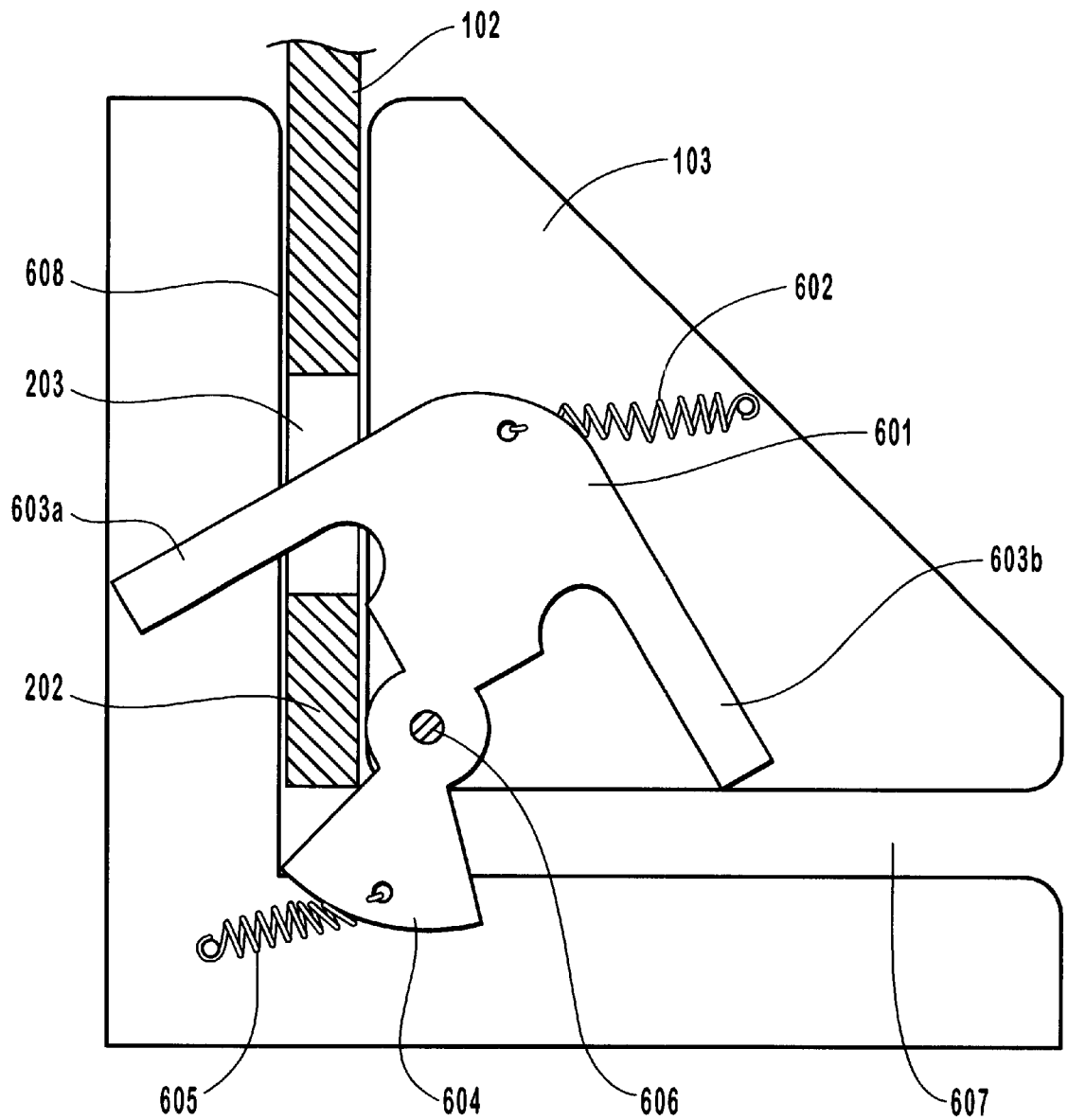
FIG. 6 is a detailed view of the internal components of the preferred interlocking buckle of this invention locked to the web tongue.

FIG. 6 is a detailed view of the internal components of the preferred interlocking buckle 103 of this invention locked to the web tongue 102. A rocker 601 is provided with a first rocker arm 603a and a second rocker arm 603b. The rocker 601 pivots around a pivot point and pin 606, with a rocker counter-weight 604. A rocker counter-weight spring 605 is fixed to the rocker counter-weight and the body of the interlocking buckle 103. A second spring 602 is fixed from the rocker 601 to the interlocking buckle 103. The rocker count-weight spring 605 and the second spring 602 are provided to assist the release of the web tongue 102 and the static tongue 104. Although the springs 602, 605 are shown as compression springs, alternative spring elements, such as leaf springs, helix springs or other spring types can be substituted without departing from the concept of this invention. A first slot 608 for receiving the web tongue 102 is provided in the interlocking buckle 103. A second slot 607 is provided for receiving the static tongue 104. This view shows the web tongue 102 inserted in the first slot 608. The tongue slot 203 has the first rocker arm 603a inserted therein.

Figure 7:
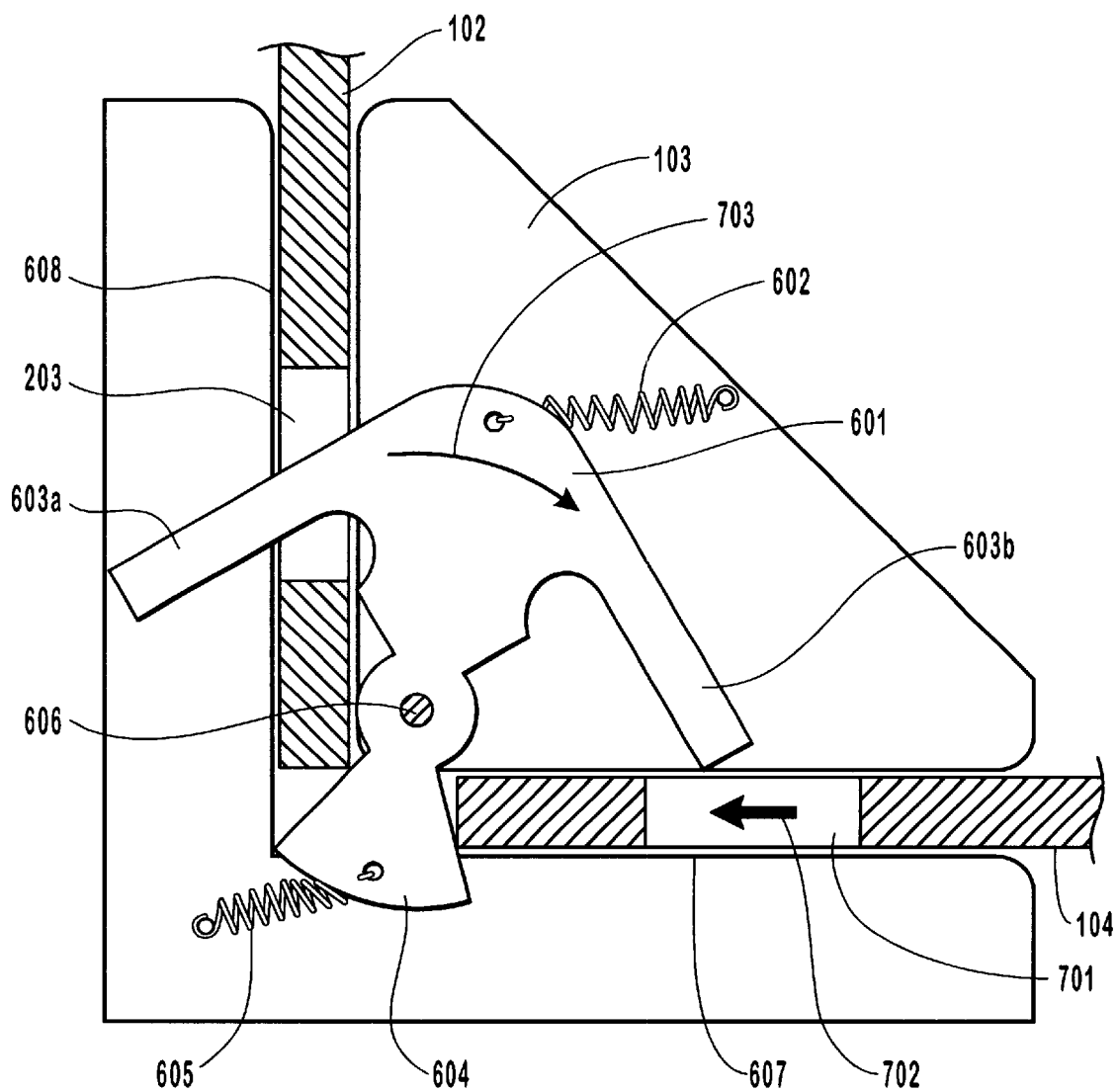
FIG. 7 is a detailed view of the internal components of the preferred interlocking buckle of this invention, with the static tongue being inserted and the web tongue about to be released.

FIG. 7 is a detailed view of the internal components of the preferred interlocking buckle 103 of this invention, with the static tongue 104 being inserted 702 and the web tongue 102 about to be released. This view shows the rocker 601 pivoting 703 around the pivot point pin 606 toward the static tongue 104, with the second rocker arm 603b about to engage the static tongue 104 by insertion into the static tongue slot 701. Simultaneously, the first rocker arm 603a is exiting the web tongue slot 203, thereby releasing the web tongue 102.

Figure 8:
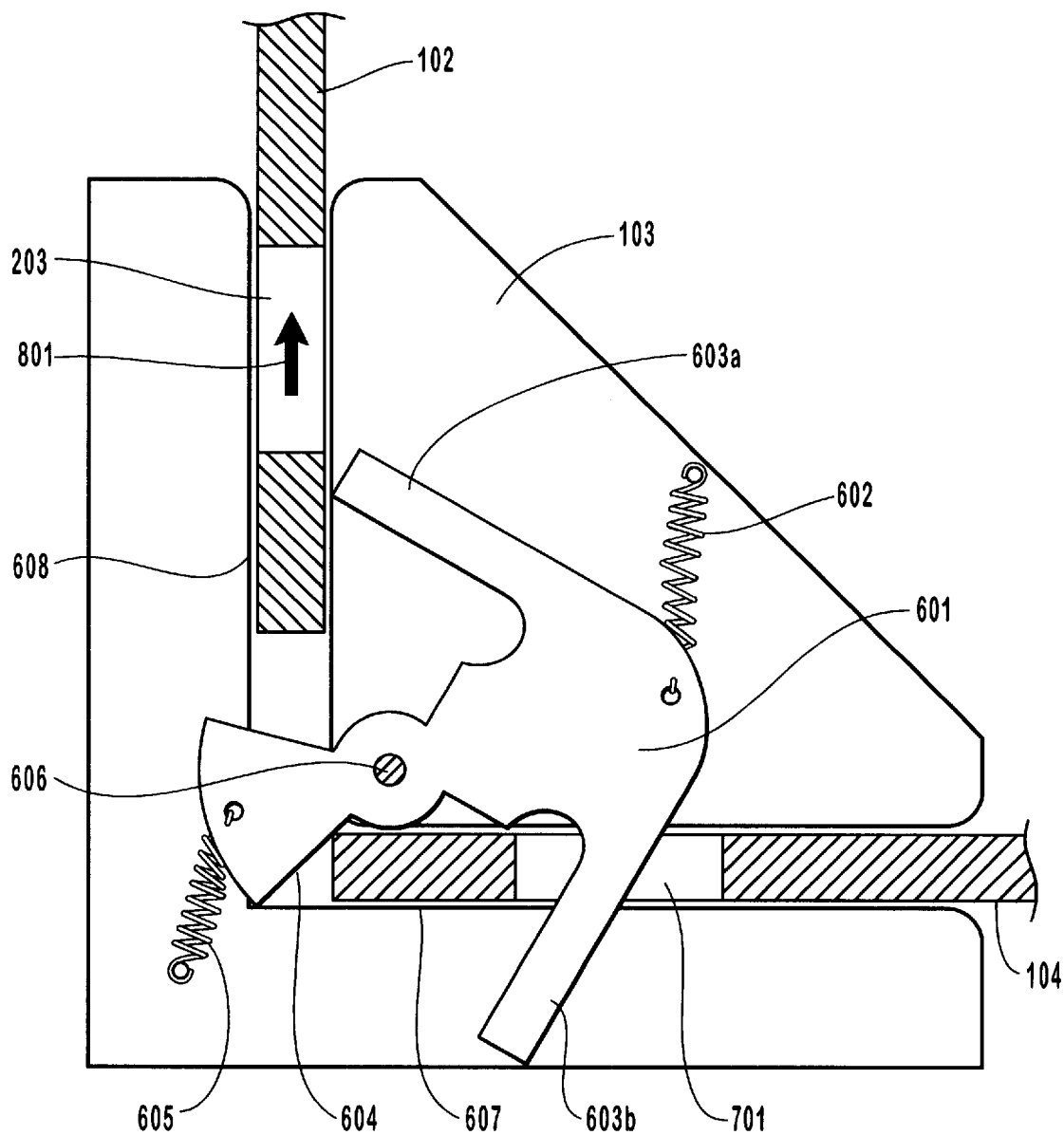
FIG. 8 is a detailed view of the internal components of the preferred interlocking buckle of this invention, with the static tongue inserted and the web tongue being released.

FIG. 8 is a detailed view of the internal components of the preferred interlocking buckle 103 of this invention, with the static tongue 104 inserted and the web tongue 102 being released 801. In this view the web tongue 102 is fully released and is withdrawing from the web tongue slot 608 of the interlocking buckle 103. The static tongue 104 is fully inserted in the static tongue slot 607 with the second rocker arm 603b inserted in the static tongue slot 701, thereby locking the static tongue 104 in place in the interlocking buckle 103.

Figure 9:
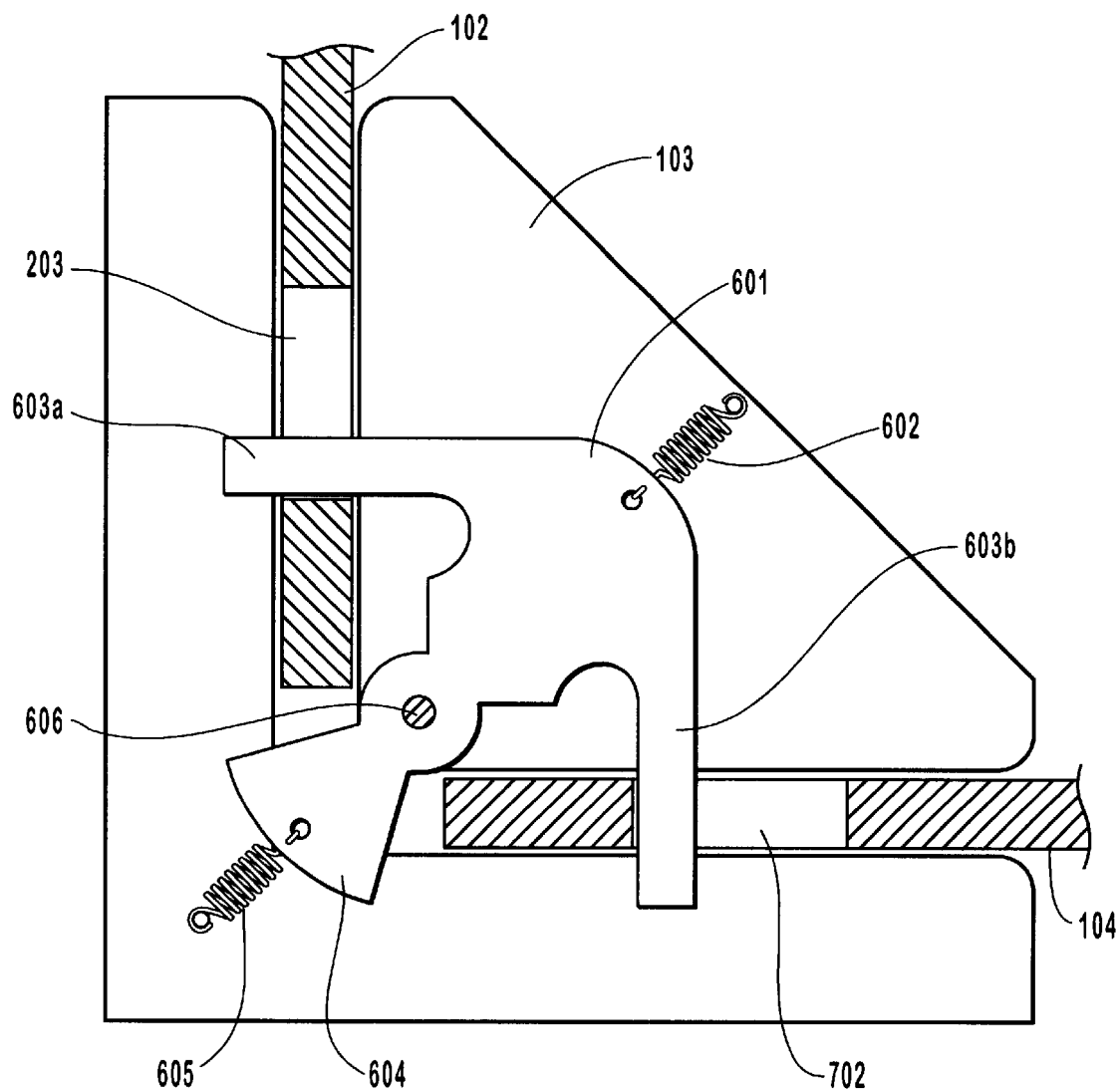
FIG. 9 is a detailed view of the internal components of the preferred interlocking buckle with the rocker in the center point of its rotation.

FIG. 9 is a detailed view of the internal components of the preferred interlocking buckle 103 with the rocker 601 in the center point of its rotation. At this point in the rocker 601 rotation both the static tongue 104 and the web tongue 102 are held in place. Although, this position is terminated by either withdrawing the web tongue 102, and thereby locking the static tongue 104, or withdrawing the static tongue 104 and thereby locking the web tongue 102 in place.

The described embodiment of the invention is to be considered in all respects only as illustrative and not as restrictive. Although the embodiment shown, describes particularly positioning of the components, the invention should not be limited thereto. The scope of this invention is, therefore, indicated by the appended claims rather than by the foregoing description. All changes, which come within the meaning and range of equivalency of the claims, are to be embraced as within their scope.

I claim:

1. An interlock buckle restraint system, comprising:
   (a) a seat belt retractor;
   (b) a seat belt web attached to said seat belt retractor;
   (c) an interlocking buckle attached to said seat belt web, said interlocking buckle comprising a body and a rocker attached to said body;
   (d) a web tongue adapted to be received into said interlocking buckle;
   (e) a static tongue adapted to be received into said interlocking buckle; and
   (f) a seat belt buckle adapted to be received by said web tongue.

2. An interlocking buckle restraint system, as recited in claim 1, wherein said rocker is pivotally attached to said body.

3. An interlocking buckle restraint system, as recited in claim 1, wherein said rocker further comprises a first rocker arm extending from said rocker, adapted to engage said web tongue.

4. An interlocking buckle restraint system, as recited in claim 1, wherein said rocker further comprises a second rocker arm extending from said rocker, adapted to engage said static tongue.

5. An interlocking buckle restraint system, as recited in claim 1, wherein said interlocking buckle further comprises a counter-weight region extending from said rocker.

6. An interlocking buckle restraint system, as recited in claim 5, wherein said interlocking buckle further comprises a counter-weight spring, having a first end and a second end, wherein said first end is attached to said counter-weight region and said second end is attached to said body.

7. An interlocking buckle restraint system, as recited in claim 5, wherein said interlocking buckle further comprises a second spring, having a first end and second end, wherein said first end is attached to said rocker and said second end is attached to said body.

8. An interlocking buckle restraint system, as recited in claim 1, wherein said interlocking buckle further comprises a rocker having a pivot point, a first rocker arm and a second rocker arm, wherein said first rocker arm engages said web tongue to lock said web tongue in place to said interlocking buckle.

9. An interlocking buckle restraint system, as recited in claim 8, wherein said second rocker arm engages said static tongue to lock said static tongue to said interlocking buckle.

10. An interlocking buckle, comprising:
   (A) a body;
   (B) a first slot for receiving a web tongue;
   (C) a second slot for receiving a static tongue;
   (D) a rocker pivotally attached to said body;
   (E) a means for engaging said rocker with said web tongue to lock said web tongue within said interlocking buckle; and
   (F) a means for engaging said rocker with said static tongue to lock said static tongue within said interlocking buckle.

11. An interlocking buckle, as recited in claim 10, wherein said means for engaging said rocker with said web tongue, further comprises a means for ensuring that said static tongue is disengaged when engaging said web tongue.

12. An interlocking buckle, as recited in claim 10, wherein said means for engaging said rocker with said static tongue, further comprises a means for ensuring that said web tongue is disengaged when engaging said static tongue.

13. An interlocking buckle, as recited in claim 10, further comprising a spring means to provide locking tension to said rocker.

* * * * *